(12) United States Patent
Landström et al.

(10) Patent No.: US 12,739,012 B2
(45) Date of Patent: Sep. 15, 2026

(54) USER EQUIPMENT AND METHOD PERFORMED THEREIN

(71) Applicant: Telefonaktiebolaget LM Ericsson (publ), Stockholm (SE)

(72) Inventors: Anders Landström, Boden (SE); Henrik Asplund, Stockholm (SE); Kjell Larsson, Luleå (SE); Niklas Jaldén, Enköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 18/847,454

(22) PCT Filed: Mar. 18, 2022

(86) PCT No.: PCT/EP2022/057198

§ 371 (c)(1),
(2) Date: Sep. 16, 2024

(87) PCT Pub. No.: WO2023/174560

PCT Pub. Date: Sep. 21, 2023

(65) Prior Publication Data

US 2025/0202566 A1 Jun. 19, 2025

(51) Int. Cl.
*H04B 3/46* (2015.01)
*H04B 7/06* (2006.01)

(52) U.S. Cl.
CPC .................................. *H04B 7/06956* (2023.05)

(58) Field of Classification Search
CPC .................................................. H04B 7/06956
USPC .................................. 375/224, 219, 295, 316
See application file for complete search history.

(56) References Cited

U.S. PATENT DOCUMENTS

2017/0078004 A1* 3/2017 Capar .................. H01Q 1/1257
2020/0350976 A1 11/2020 Bai et al.
2020/0382194 A1* 12/2020 Park ...................... H04W 72/21
2021/0068123 A1 3/2021 Zhu et al.

FOREIGN PATENT DOCUMENTS

WO 2018048543 A1 3/2018
WO WO-2024096638 A1 * 5/2024 ............. G06N 3/045

OTHER PUBLICATIONS

International Search Report and Written Opinion for International Patent Application No. PCT/EP2022/057198, mailed Oct. 24, 2022, 8 pages.
Examination Report for European Patent Application No. 22716900.0, mailed Jun. 23, 2026, 5 pages.

* cited by examiner

*Primary Examiner* — Zewdu A Kassa
(74) *Attorney, Agent, or Firm* — Withrow & Terranova, PLLC

(57) ABSTRACT

It is herein disclosed a method performed by a UE for handling communication in a wireless communication network. The UE obtains an indication of a performance of one or more beams of an antenna panel of the UE. The UE adapts one or more beam parameters of at least one antenna panel of the UE based on the obtained indication, wherein the one or more beam parameters are for establishing one or more beams of the at least one antenna panel of the UE.

15 Claims, 12 Drawing Sheets a
c b
d
e

Fig. 6 beam #9, panel #1
beam #1, panel #2

Fig. 7a beam #9, panel #1 = beam #1, panel #2

Fig. 7b

Height
180°
N
S

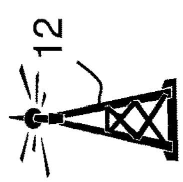
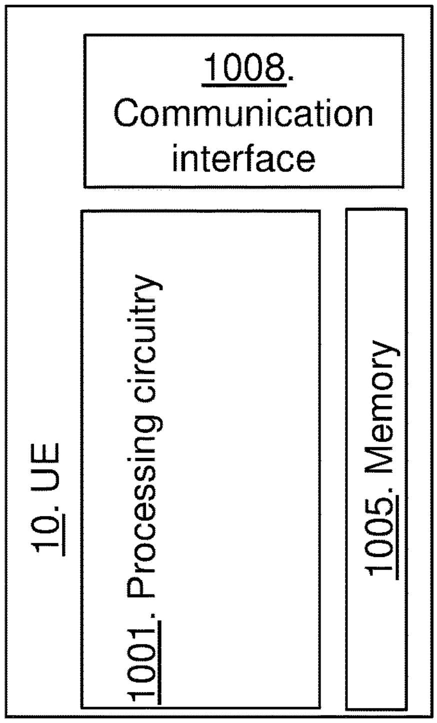
FIG. 9b
10. UE
1002. Receiving unit
1003. Obtaining unit
1004. Beamforming unit
1001. Processing circuitry
1005. Memory
FIG. 9a
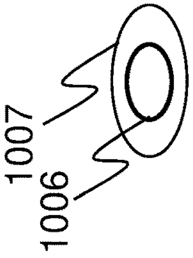

USER EQUIPMENT AND METHOD PERFORMED THEREIN

This application is a 35 U.S.C. § 371 national phase filing of International Application No. PCT/EP2022/057198, filed Mar. 18, 2022, the disclosure of which is incorporated herein by reference in its entirety.

TECHNICAL FIELD

Embodiments herein relate to a user equipment (UE), and a method performed therein regarding wireless communication. Furthermore, a computer program product and a computer readable storage medium are also provided herein. In particular, embodiments herein relate to handling beams of the UE in a wireless communication network.

BACKGROUND

In a typical wireless communication network, UEs, also known as wireless communication devices, mobile stations, stations (STA) and/or wireless devices, communicate via a Radio Access Network (RAN) with one or more core networks (CN). The RAN covers a geographical area which is divided into service areas or cells, with each service area or cell being served by at least one radio network node such as an access node, e.g., a Wi-Fi access point or a radio base station (RBS), which in some networks may also be called, for example, a NodeB, a gNodeB, or an eNodeB. The service area or cell is a geographical area where radio coverage is provided by the radio network node. The radio network node operates on radio frequencies to communicate over an air interface with the UEs within range of the radio network node. The radio network node communicates over a downlink (DL) to the UE and the UE communicates over an uplink (UL) to the radio network node.

A Universal Mobile Telecommunications System (UMTS) is a third generation (3G) telecommunication network, which evolved from the second generation (2G) Global System for Mobile Communications (GSM). The UMTS terrestrial radio access network (UTRAN) is essentially a RAN using wideband code division multiple access (WCDMA) and/or High-Speed Packet Access (HSPA) for communication with user equipment. In a forum known as the Third Generation Partnership Project (3GPP), telecommunications suppliers propose and agree upon standards for present and future generation networks and investigate, e.g., enhanced data rate and radio capacity. In some RANs, e.g., as in UMTS, several radio network nodes may be connected, e.g., by landlines or microwave, to a controller node, such as a radio network controller (RNC) or a base station controller (BSC), which supervises and coordinates various activities of the plural radio network nodes connected thereto. The RNCs are typically connected to one or more core networks.

Specifications for the Evolved Packet System (EPS) have been completed within the 3GPP and coming 3GPP releases, such as New Radio (NR), are worked on. The EPS comprises the Evolved Universal Terrestrial Radio Access Network (E-UTRAN), also known as the Long-Term Evolution (LTE) radio access network, and the Evolved Packet Core (EPC), also known as System Architecture Evolution (SAE) core network. E-UTRAN/LTE is a 3GPP radio access technology wherein the radio network nodes are directly connected to the EPC core network. As such, the Radio Access Network (RAN) of an EPS has an essentially "flat" architecture comprising radio network nodes connected directly to one or more core networks.

With the emerging 5G technologies such as NR, the use of very many transmit- and receive-antenna elements may be of great interest as it makes it possible to utilize beamforming, such as transmit-side and receive-side beamforming. Transmit-side beamforming means that the transmitter can amplify the transmitted signals in a selected direction or directions, while suppressing the transmitted signals in other directions. Similarly, on the receive-side, a receiver can amplify signals from a selected direction or directions, while suppressing unwanted signals from other directions.

Due to varying nature of wireless communication channel, data transmission between a gNB and the UE needs to adapt the modulation scheme and code rate to suit different channel conditions. In NR downlink transmission methods such as multi-layer transmission, transmission point selection, beam selection etc. are very flexible. Therefore, in NR Channel State Information (CSI) may comprise one or more out of:

- CQI: Channel Quality Indicator
- PMI: Pre-coding Matrix Indicator
- CRI: CSI-RS Resource Indicator
- LI: Layer Indicator
- RI: Rank Indicator
- SSBRI: synchronization signal (SS)/physical broadcast channel (PBCH) Block Resource Indicator
- L1-RSRP: Layer one-reference signal received power.

In frequency range two (FR2) mmWave beamforming in the UE is introduced.

For complexity, cost, battery consumption and space reasons, analogue beamforming may be used. Analogue beamforming means time-wise scanning of beam candidates. There can be a large number of beams to scan, see FIG. 1. A user equipment may comprise, for example, 4 antenna panels with respective 15 beams each, resulting in 60 beams to scan. Each cell can have up to 64 SS/PBCH Block (SSB) candidates to scan resulting in 3840 combinations to scan for one cell. On top of that there are also neighbouring cells with up to 64 SSB each. FIG. 1 shows an example of UE antenna panels and beams.

There are two ways for the network (NW) to assist the UE in finding a proper beam towards the radio network node:

- Transmission Configuration Indicator (TCI) states: The UE keeps track of which beams to use for different TCI states, which normally correspond to the SSBs. A new active TCI state is assigned by the NW, allowing the UE to switch to the beam used for the corresponding state.
- In a so called P3 process, which is a beam refinement for a UE reception. In P3, a gNB fixes a beam, i.e., transmits the same beam repeatedly, and the UE refines its receiver beam and sets a Spatial Filter on receiver antenna array. Thus, the CSI-reference signal (RS) may be transmitted in a certain beam with "repetition on", allowing the UE to adjust its reception (Rx) beam for the NW traffic beam once it has been selected.

Hence, the UE may be told how to change its beam quickly by changing a TCI state, or it can be assisted in selecting Rx beam for the traffic beam. But, as a first step, the UE needs to keep track of which beam to use for each SSB, not only for different TCI states, since other SSBs are also of interest, e.g., those from another cell. Here, the UE is on its own.

Beam management is often implemented in a chipset, which may be used by different UE vendors and/or models where the relative placement of the antenna panels differs. On top of that, even UEs of the same model may be differently affected by external factors affecting radio propagation. For instance, one user may prefer to hold the UE in the right hand while another prefers the left. It should also be noted that most UEs have gyro functions enabling relating beams to geographical directions.

Scanning all potential NW and/or UE beam combinations takes long time. A poor selection of UE Rx beams in use causes unnecessary signalling overhead and latency, as resources could be better spent on other beams.

As the physical placement of the antenna panels may vary between different UE models, the beam grid and transitions between UE beams will be affected and a beam setup that works well on one UE model may cause poor performance on other UE models. To further complicate things, optimal usage of antenna panels and beams may depend on external factors and thereby differ also between UEs sharing a similar hardware.

SUMMARY

An object herein is to provide a mechanism to handle communication in an efficient manner to improve performance of the wireless communication network.

According to an aspect the object is achieved by providing a method performed by a UE for handling communication in a wireless communication network. The UE obtains an indication of a performance of one or more beams of an antenna panel of the UE. The UE adapts one or more beam parameters of at least one antenna panel of the UE based on the obtained indication, wherein the one or more beam parameters are for establishing one or more beams of the at least one antenna panel of the UE.

According to an aspect the object is achieved, according to embodiments herein, by providing a UE configured to perform the methods herein. Thus, according to an aspect the object is achieved by providing a UE for handling communication in a wireless communication network. The UE is configured to obtain an indication of a performance of one or more beams of an antenna panel of the UE. The UE is further configured to adapt one or more beam parameters of at least one antenna panel of the UE based on the obtained indication, wherein the one or more beam parameters are for establishing one or more beams of the at least one antenna panel of the UE.

It is furthermore provided herein a computer program product comprising instructions, which, when executed on at least one processor, cause the at least one processor to carry out the method above, as performed by the UE. It is additionally provided herein a computer-readable storage medium, having stored thereon a computer program product comprising instructions which, when executed on at least one processor, cause the at least one processor to carry out the method above, as performed by the UE.

Embodiments herein disclose a beam grid or a grid of beams (GoB) that is adapted to the experienced usage over time of the currently used beams and/or antenna panel. Embodiments herein disclose procedures for the UE to dynamically change, for example, a reception antenna configuration. The UE may adaptively balance the number of beams in use based on a Rx quality and avoids unnecessary waste of resources and/or a sub-optimal connection. The adaptation results in as faster beam management, which provides shorter delays, improved user experience and/or an improved over all network performance. Avoiding use of unnecessary beams avoids unnecessary overhead, resulting in saving energy and UE battery life. This will thus result in an improved performance of the wireless communication network.

BRIEF DESCRIPTION OF THE DRAWINGS

Embodiments will now be described in more detail in relation to the enclosed drawings, in which:

FIG. 6 shows an overview depicting some embodiments herein;

FIGS. 7*a*-7*b* show overviews depicting some embodiments herein;

FIGS. 9*a*-9*b* show block diagrams depicting embodiments of a UE according to embodiments herein;

DETAILED DESCRIPTION

Figure 1:
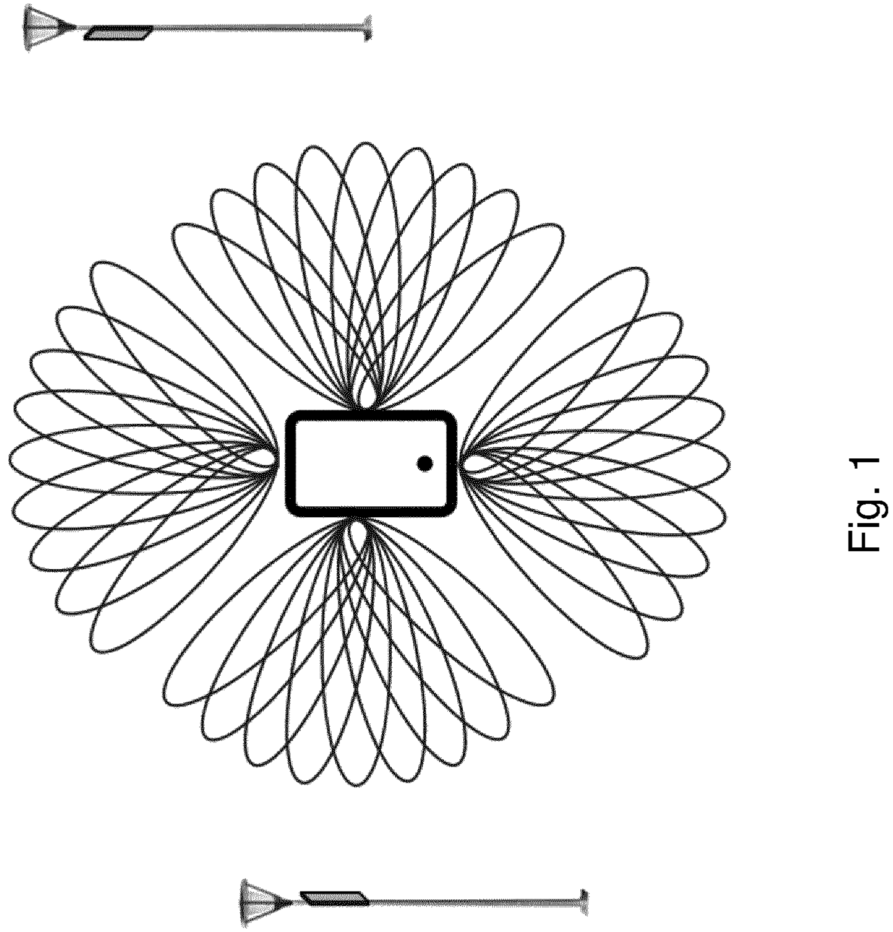
FIG. 1 shows UE antenna panels and beams according to prior art.
Figure 2:
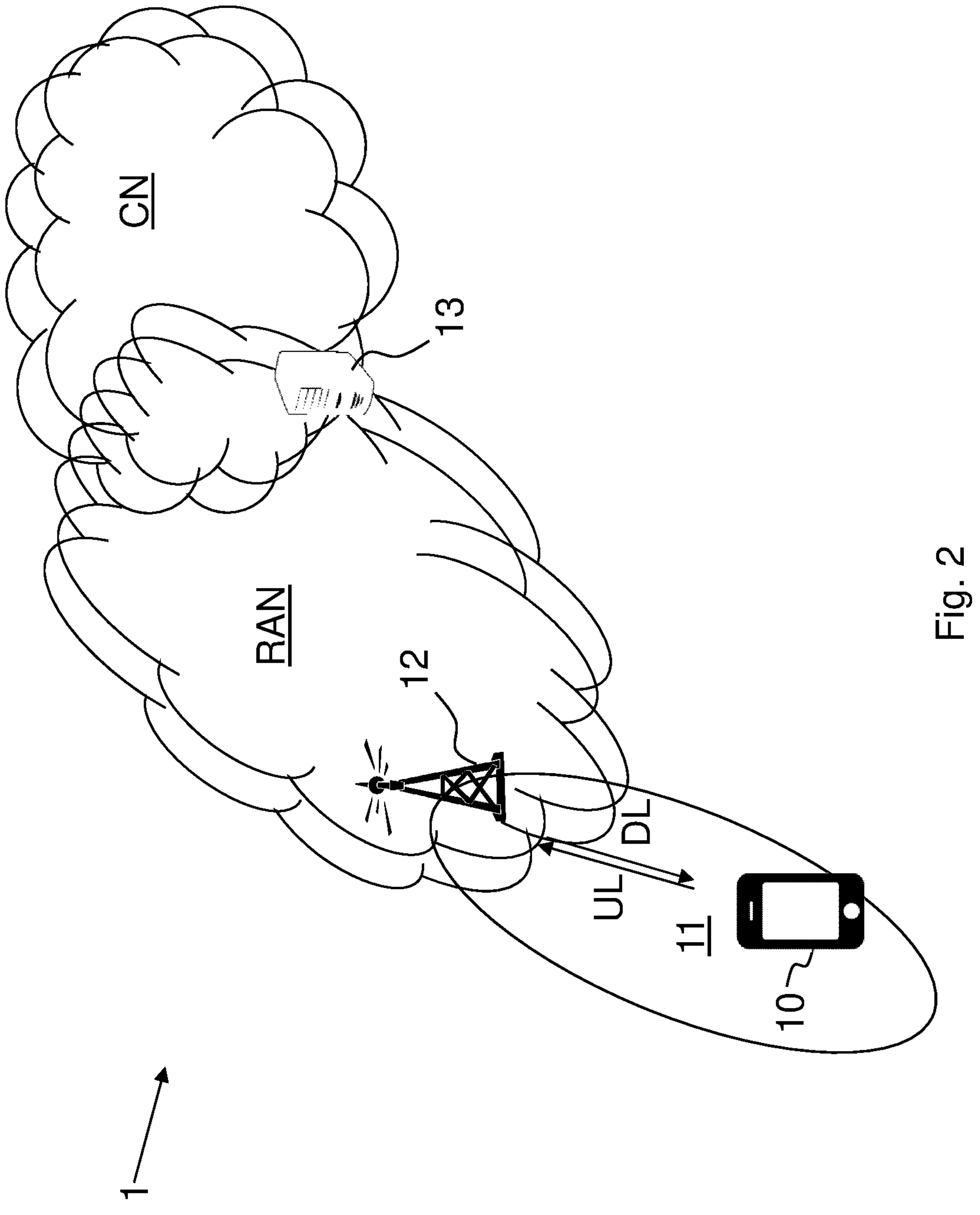
FIG. 2 shows an overview depicting a wireless communication network according to embodiments herein.

Embodiments herein relate to wireless communication networks in general. FIG. 2 is a schematic overview depicting a wireless communication network 1. The wireless communication network 1 comprises one or more RANs and one or more CNs. The wireless communication network 1 may use one or a number of different technologies. Embodiments herein relate to recent technology trends that are of particular interest in a New Radio (NR) context, however, embodiments are also applicable in further development of existing wireless communications systems such as e.g. LTE or Wideband Code Division Multiple Access (WCDMA).

In the wireless communication network 1, a user equipment (UE) 10 exemplified herein as a wireless device such as a mobile station, a non-access point (non-AP) station (STA), a STA and/or a wireless terminal, is comprised communicating via e.g. one or more Access Networks (AN), e.g. radio access network (RAN), to one or more core networks (CN). It should be understood by the skilled in the art that "UE" is a non-limiting term which means any terminal, wireless communications terminal, user equipment, narrowband internet of things (NB-IoT) device, Machine Type Communication (MTC) device, Device to Device (D2D) terminal, or node e.g. smart phone, laptop, mobile phone, sensor, relay, mobile tablets or even a small base station capable of communicating using radio communication with a radio network node within an area served by the radio network node.

The wireless communication network 1 comprises a radio network node 12 or just a RAN-node, providing radio coverage over a geographical area, a first service area 11 or first cell, of a first radio access technology (RAT), such as NR, LTE, or similar. The radio network node 12 may be a transmission and reception point such as an access node, an access controller, a base station, e.g. a radio base station such as a gNodeB (gNB), an evolved Node B (eNB, eNode B), a NodeB, a base transceiver station, a radio remote unit, an Access Point Base Station, a base station router, a Wireless Local Area Network (WLAN) access point or an Access Point Station (AP STA), a transmission arrangement of a radio base station, a stand-alone access point or any other network unit or node capable of communicating with a UE within the area served by the radio network node depending, e.g., on the first radio access technology and terminology used. The radio network node may be referred to as a serving radio network node wherein the service area may be referred to as a serving cell, and the serving network node communicates with the UE in form of DL transmissions to the UE and UL transmissions from the UE. It should be noted that a service area may be denoted as a cell, beam, beam group or similar, to define an area of radio coverage.

It is herein disclosed a UE-specific adaption of its beams to optimize a UE grid of beams (GoB). Thus, a dynamic UE beam grid is achieved by continuously updating and adapting to an experienced usage of the currently used beams and/or antenna panel or panels, for example, the UE 10 may configure a map of currently used transmission (Tx) and/or reception (Rx) beams by learning from beam usage over time. This could be done by having a larger pre-configured set of beams in the UE 10 and from that set dynamically select a smaller set of currently used beams. Alternatively or additionally, new beams, i.e., antenna element weights, may be calculated in the UE 10 when needed, based on configured hardware (HW) properties such as, e.g. antenna element distance or similar.

Figure 3:
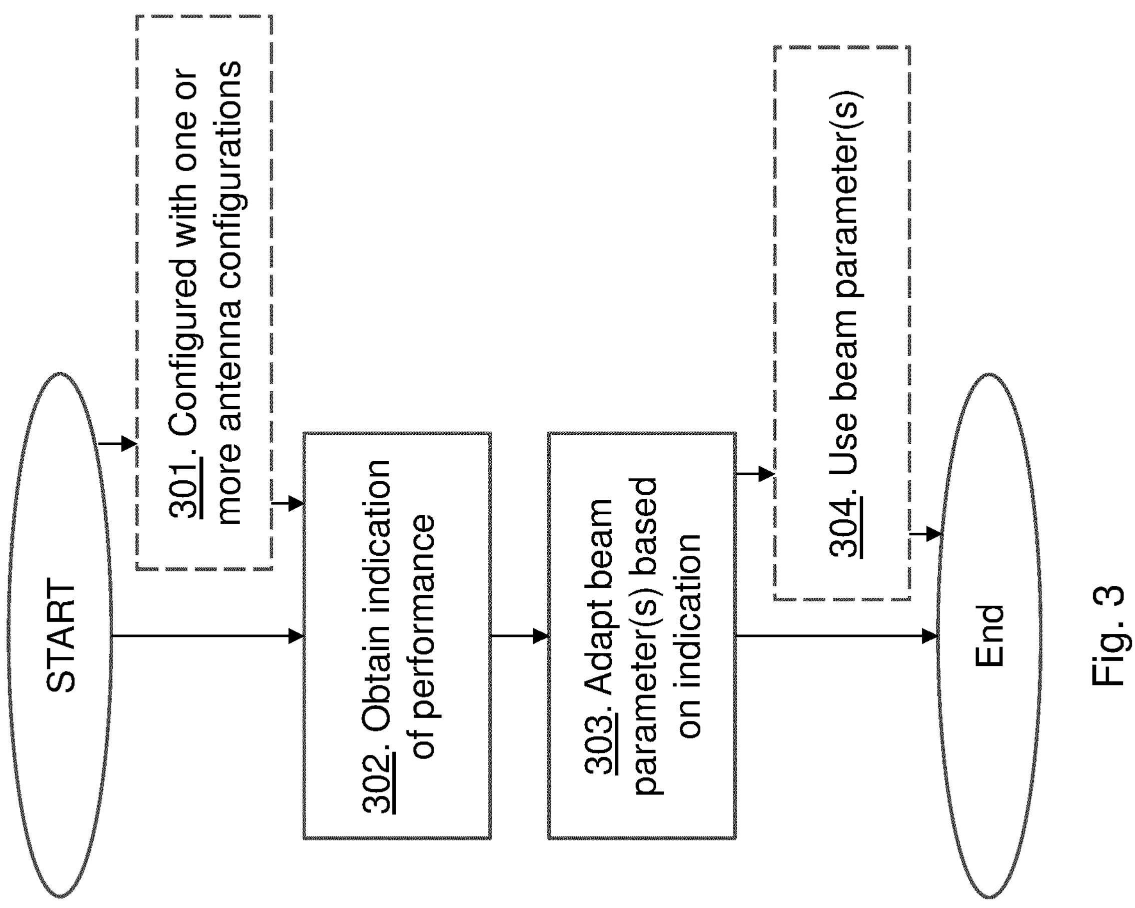
FIG. 3 shows a flowchart illustrating a method performed by a UE according to embodiments herein.

The method actions performed by the UE 10 for handling communication in the wireless communication network 1 according to embodiments herein will now be described with reference to a flowchart depicted in FIG. 3. The actions do not have to be taken in the order stated below, but may be taken in any suitable order. Dashed boxes indicate optional features.

Action 301. The UE 10 may be configured with one or more antenna configurations. Each antenna configuration may comprise one or more beam parameters for one or more antenna panels. The one or more beam parameters are for establishing beams of respective antenna panel.

Action 302. The UE 10 obtains an indication of a performance of one or more beams of an antenna panel of the UE 10. The UE 10 may, for example, measure a strength or quality of a signal indicating the performance.

Action 303. The UE 10 adapts one or more beam parameters of at least one antenna panel of the UE 10 based on the obtained indication. The one or more beam parameters are for establishing one or more beams of the at least one antenna panel of the UE 10. The at least one antenna panel may be the antenna panel related to the obtained indication or another antenna panel. Thus, the UE 10 may adapt a beam of a different antenna panel than the one antenna panel measured on. The UE 10 may adapt the one or more beam parameters by removing a beam of a grid of beams for the at least one antenna panel of the UE 10. The indication of the performance may be indicating that a beam, i.e., the removed beam, is overlapping a coverage of another beam, that the removed beam has a similar incidence angle or departure angle as another beam, and/or that the removed beam is not used over a time period. Similar incidence angle or departure angle, as used herein, means beams with incidence angles or departure angles within a certain angle interval difference such as plus or minus 3 degrees. The UE 10 may adapt the one or more beam parameters by adding a beam of a GoB for the at least antenna panel of the UE 10, and/or widening a coverage of a beam of the grid of beams for the at least one antenna panel of the UE 10. The indication of the performance may comprise a measurement of a strength or quality of a signal, and the UE 10 may add the beam or widen the coverage of a beam based on the measurement. The UE 10 may adapt the one or more beam parameters by adding a priority for monitoring of one or more beams of a grid of beams for the at least one antenna panel of the UE 10. Thus, the priority may define how often a beam is probed, herein meaning that by setting the priority it is indicated to test a beam more or less often than other beams. The indication may be related to a present location and/or position of the UE 10, such as a geographical position, a movement direction, a UE rotation, a speed of the UE 10 and/or similar, and the UE 10 may adapt the one or more beam parameters based on the present location and/or position of the UE 10. The indication may be related to an application presently used at the UE 10, and the UE 10 may adapt the one or more beam parameters based on the application used. The indication may thus be of a present performance, and the UE 10 may adapt the one or more beam parameters by dynamically changing the one or more beam parameters of the at least one antenna panel of the UE 10 based on the present performance. It should be noted that any combination of the adaption may be performed by the UE 10.

Action 304. The UE 10 may then use the adapted one or more beam parameters to monitor beams of a GoB for the at least one antenna panel of the UE 10.

It should be noted that the one or more beams may be one or more reception beams and/or transmission beams.

Thus, the UE 10 may adapt GoB based on, for example, radio signal measurements of one or more reception beams. The UE 10 may remove unnecessary beams, overlapping or not used beams, when monitoring beams, thereby saving energy and UE battery life.

Below are examples disclosed for adapting the one or more beam parameters of one or more antenna configurations.

Figure 4:
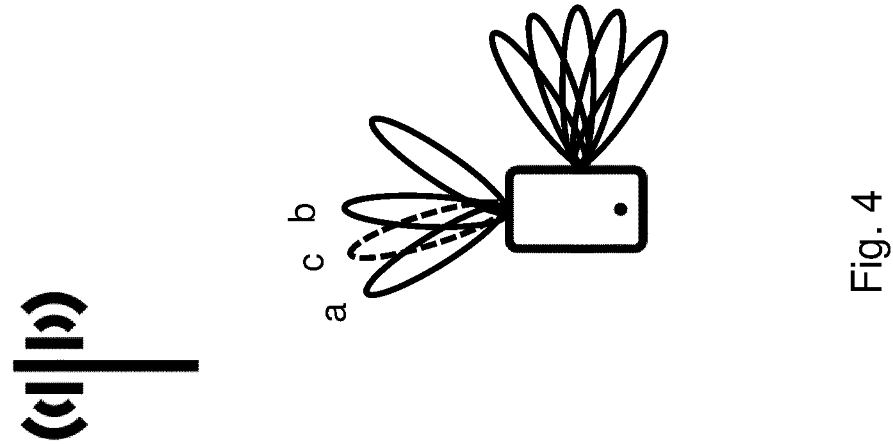
FIG. 4 shows an overview depicting some embodiments herein.

FIG. 4 shows a representation where the UE 10 adds a beam between two beams. If the UE 10 detects that the experienced quality measure for a beam, e.g., signal measurement such as reference signal received power (RSRP) or received signal received quality (RSRQ), deteriorates below a threshold before a better beam is found, it may activate a currently not used beam. FIG. 4 shows the representation where beam c is added in-between two presently used beams, or one may introduce a new beam by calculating a new set of antenna element weights as a function of the desired beam direction and the distance between antenna elements.

Figure 5:
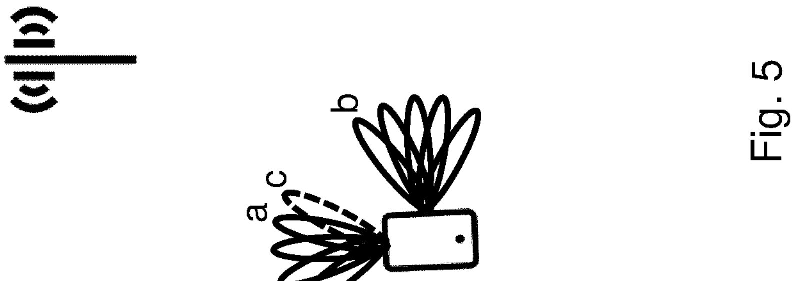
FIG. 5 shows an overview depicting some embodiments herein.

FIG. 5 shows a representation where the UE adds a beam between beam-sets for two antenna panels. If the UE 10 detects that the quality measure for a certain beam, e.g., signal measurement such as RSRP, deteriorates too much before finding a new beam on the next antenna panel over time or during rotation, the UE 10 may attempt to widen the GoB for at least one of the two antenna panels by adding an edge beam to the set of currently used beams. FIG. 5 shows that a beam 'c' is added since the quality drop is too large between beams 'a' and 'b'. Alternatively, a change of orientation of the UE 10 during rotation together with knowledge of previously used beams could be used to decide an intended direction of the added beam(s), relative to the rest of the GoB. FIG. 5 shows an embodiment estimating a new beam direction based on existing UE beams and antenna panel(s), aiming for reduced straddling loss between antenna panels.

Figures 6, 7A, 7B:
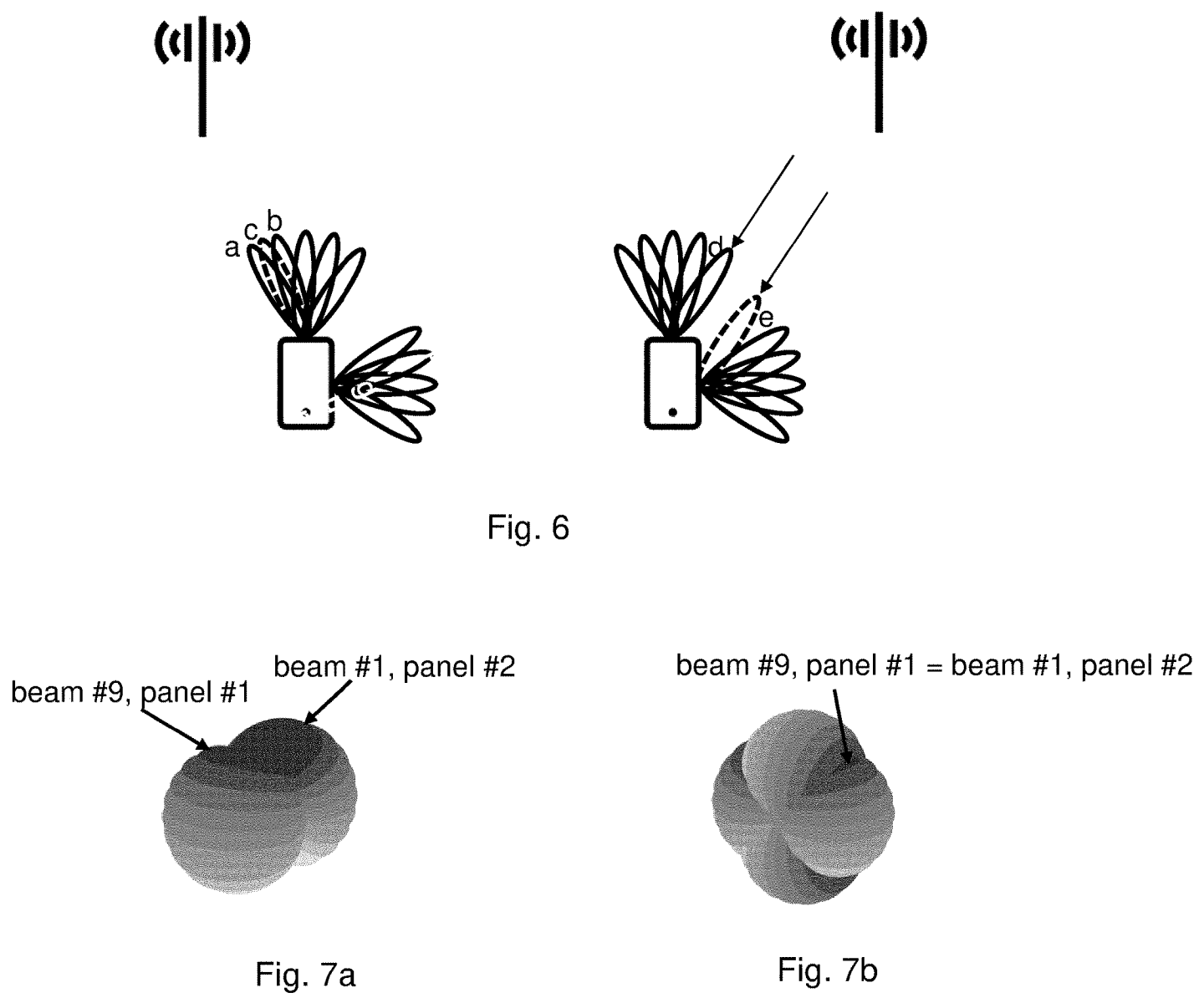

FIG. 6 shows a representation where the UE 10 removes overlapping beams. If the UE 10 detects that two or more beams are largely overlapping, and/or produce a similar quality measure, e.g. RSRP measurement, over time, the UE 10 may remove one of the beams from its list of used beams. Two examples are illustrated in FIG. 6. The left example shows identifying and removing a beam c which overlaps with other beams 'a' and 'b' from the same panel. The right example shows identifying and removing a beam 'e' which covers the same incidence angle as beam 'd' at another panel and therefore yields similar RSRP measurements over time.

In FIGS. 7*a*-7*b*, an example is shown when adding more panels to a UE can cause some beams to be unlikely used. FIGS. 7*a*-7*b* show a comparison of a 3D GoB for a two-panel UE (panel #1 and panel #2), see FIG. 7*a*, where all beams are useful; and a 3D GoB for a 4-panel UE, see FIG. 7*b*, where some beams are overlapping. Thus, FIG. 7*b* schematically shows that beam #9 in panel #1 overlaps with beam #1 in panel #2, where the beam and panel notations are used for illustration purposes only.

In some embodiments, the UE 10 may remove unused beams and/or antenna panels. If the UE 10 detects that a beam or beams within an entire antenna panel are unused, i.e., produces low quality measure(s) compared to a fixed threshold or relative to surrounding beams, the one or more beams are removed from the list of used beams. Poor performance of individual beams could be, e.g., due to beams pointing in a bad direction relative to the base station, e.g., towards the ground or the sky, while poor performance for a group of beams could be, e.g., due to the user holding the UE 10 in such a way that his/her hand covers an antenna panel, which makes all beams there waste time and/or resources during an antenna sweep. A beam may also be removed since it is being used seldom, as in FIG. 7*b* where the beam(s) marked with the arrow has highest gain for only a small part of the 3D sphere.

Figures 8A, 8B:
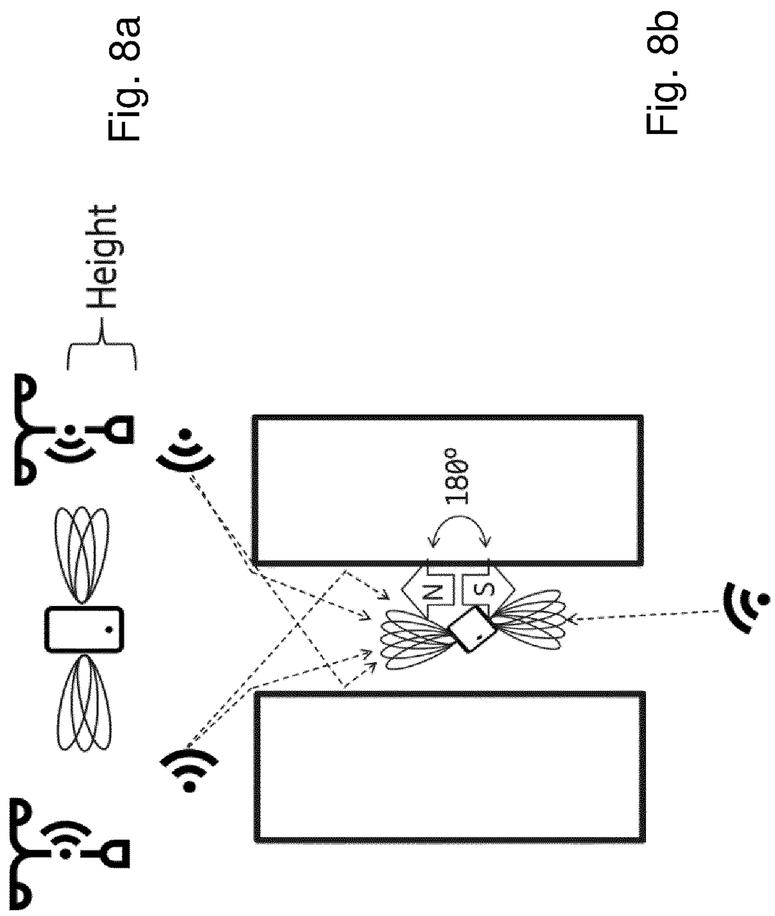
FIG. 8 shows an overview depicting some embodiments herein.

FIGS. 8*a*-8*b* illustrate examples where UE beams point in the wrong directions due to UE rotation and used deployment. The illustration of FIG. 8*a*, when the base stations are located low, shows a situation when it can be unlikely that beams not pointing in the horizontal plane are used. In the illustration of FIG. 8*b*, paths along a street (in this case from north, N, or south, S) are the likely paths and hence the UE beams pointing to the side are unlikely to be a candidate beam to be used.

FIGS. 8*a*-8*b* show examples of cases where the channel causes some beams to perform badly, since some beams are pointing in directions where a strong signal is unlikely.

In some embodiments, the UE 10 may utilize location knowledge. The UE 10 may keep track of which beams/GoB to use, based on previously used beams at a certain location. This could be done directly by using global positioning system (GPS) positioning, indirectly by location fingerprinting on reference signals, and/or using one or more combinations of, e.g., GPS, a compass, and an accelerometer.

The UE 10 may alternatively or additionally adapt GoB based on application (app) used. The UE 10 may keep track of which beams or GoB to use, based on previously used beam for a certain app or type of app, as different app-types often render different handset usage patterns. For example, using a game app may require the UE 10 to be held by both hands and using a video call may often result in having the UE 10 in a vertical position with one hand. This could for instance be done by implementing a Look-Up-Table between apps and GoBs or beams, e.g., "For app X, use GoB Y" or "For app X, use beams {a, b, c, g, h, k}".

The UE 10 may alternatively or additionally adapt beam priority. As in any of the previous embodiments, but instead of adding or removing beams, the UE 10 may prioritize beams so that beams with low priority are used more seldom than beams with higher priority. Hence, beams with lower priority may be tested, more seldom than other beams, to see if their priority should increase as a result of changing channel conditions.

It should be noted that any combination of the mentioned embodiments may be implemented.

FIGS. 9*a*-9*b* are block diagrams depicting the UE 10, in two embodiments, for handling communication in the wireless communication network 1 according to embodiments herein.

The UE 10 may comprise processing circuitry 1001, e.g. one or more processors, configured to perform the methods herein.

The UE 10 may comprise a receiving unit 1002, e.g. a receiver or transceiver. The UE 10, the processing circuitry 1001, and/or the receiving unit 1002 may be configured to receive configuration data from the radio network node 12 for managing beams. Thus, the UE 10 may be configured by the radio network node 12 or be preconfigured with ways how to configure GoB or GoBs.

The UE 10 may comprise an obtaining unit 1003, e.g., a measurement unit and/or a receiver. The UE 10, the processing circuitry 1001, and/or the obtaining unit 1003 is configured to obtain the indication of the performance of one or more beams of an antenna panel of the UE 10. The UE 10, the processing circuitry 1001, and/or the obtaining unit 1003 may be configured to measure signal strength or quality, or receive indications of t measured signal strength or quality.

The UE 10 may comprise a beamforming unit 1004. The UE 10, the processing circuitry 1001, and/or the beamforming unit 1004 is configured to adapt the one or more beam parameters of at least one antenna panel of the UE 10 based on the obtained indication, wherein the one or more beam parameters are for establishing one or more beams of the at least one antenna panel of the UE 10.

The UE 10, the processing circuitry 1001, and/or the beamforming unit 1004 may be configured to adapt the one or more beam parameters by removing a beam of a grid of beams for the at least one antenna panel of the UE 10. The indication of performance may be indicating that the removed beam is overlapping a coverage of another beam, that the removed beam has a similar incidence or departure angle as another beam, and/or that the removed beam is not used over a time period.

The UE 10, the processing circuitry 1001, and/or the beamforming unit 1004 may be configured to adapt the one or more beam parameters by adding a beam of a grid of beams for the at least one antenna panel of the UE (10), and/or by widening a coverage of a beam of the grid of beams for the at least one antenna panel of the UE 10. The indication of the performance may comprise a measurement of a strength or quality of a signal, and wherein the UE 10 the processing circuitry 1001, and/or the beamforming unit 1004 may be configured to add the beam or widen the coverage of a beam based on the measurement.

The UE 10, the processing circuitry 1001, and/or the beamforming unit 1004 may be configured to adapt the one or more beam parameters by adding a priority for monitoring of one or more beams of a grid of beams for the at least one antenna panel of the UE 10.

The UE 10, the processing circuitry 1001, and/or the beamforming unit 1004 may be configured to use the adapted one or more beam parameters to monitor beams of a grid of beams for the at least one antenna panel of the UE 10.

The indication may be related to a present location and/or position of the UE 10, and the UE 10, the processing circuitry 1001, and/or the beamforming unit 1004 may be configured to adapt the one or more beam parameters based on the present location and/or position of the UE.

The indication may be related to an application presently used at the UE 10, and the UE 10, the processing circuitry 1001, and/or the beamforming unit 1004 may be configured to adapt the one or more beam parameters based on the application used.

The indication may be of a present performance, and the UE 10, the processing circuitry 1001, and/or the beamforming unit 1004 may be configured to adapt the one or more beam parameters by dynamically changing the one or more beam parameters of the at least one antenna panel of the UE 10 based on the present performance.

The one or more beams may be one or more reception beams and/or transmission beams.

The UE 10 may comprise a memory 1005. The memory 1005 comprises one or more units to be used to store data on, such as indications, beam parameters, thresholds, events and applications to perform the methods disclosed herein when being executed, and similar. Furthermore, the UE 10 may comprise a communication interface 1008 such as comprising a transmitter, a receiver, a transceiver and/or one or more antennas.

The methods according to the embodiments described herein for the UE 10 are respectively implemented by means of, e.g., a computer program product 1006 or a computer program, comprising instructions, i.e., software code portions, which, when executed on at least one processor, cause the at least one processor to carry out the actions described herein, as performed by the UE 10. The computer program product 1006 may be stored on a computer-readable storage medium 1007, e.g., a disc, a universal serial bus (USB) stick or similar. The computer-readable storage medium 1007, having stored thereon the computer program product, may comprise the instructions which, when executed on at least one processor, cause the at least one processor to carry out the actions described herein, as performed by the UE 10. In some embodiments, the computer-readable storage medium may be a transitory or a non-transitory computer-readable storage medium. Thus, embodiments herein may disclose a UE 10 for handling communication in a wireless communication network, wherein the UE 10 comprises processing circuitry and a memory, said memory comprising instructions executable by said processing circuitry whereby said UE 10 is operative to perform any of the methods herein.

In some embodiments a more general term "radio network node" is used and it can correspond to any type of radio-network node or any network node, which communicates with a wireless device and/or with another network node. Examples of network nodes are NodeB, MeNB, SeNB, a network node belonging to Master cell group (MCG) or Secondary cell group (SCG), base station (BS), multi-standard radio (MSR) radio node such as MSR BS, eNodeB, gNodeB, network controller, radio-network controller (RNC), base station controller (BSC), relay, donor node controlling relay, base transceiver station (BTS), access point (AP), transmission points, transmission nodes, Remote radio Unit (RRU), Remote Radio Head (RRH), nodes in distributed antenna system (DAS), etc.

In some embodiments the non-limiting term wireless device or user equipment (UE) is used and it refers to any type of wireless device communicating with a network node and/or with another wireless device in a cellular or mobile communication system. Examples of UE are target device, internet of things (IoT) capable device, a device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any RAT or multi-RAT systems, where the wireless device receives and/or transmit signals (e.g. data) e.g. New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMax), or Ultra Mobile Broadband (UMB), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a wireless device or network node, for example.

Alternatively, several of the functional elements of the processing means discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 10:
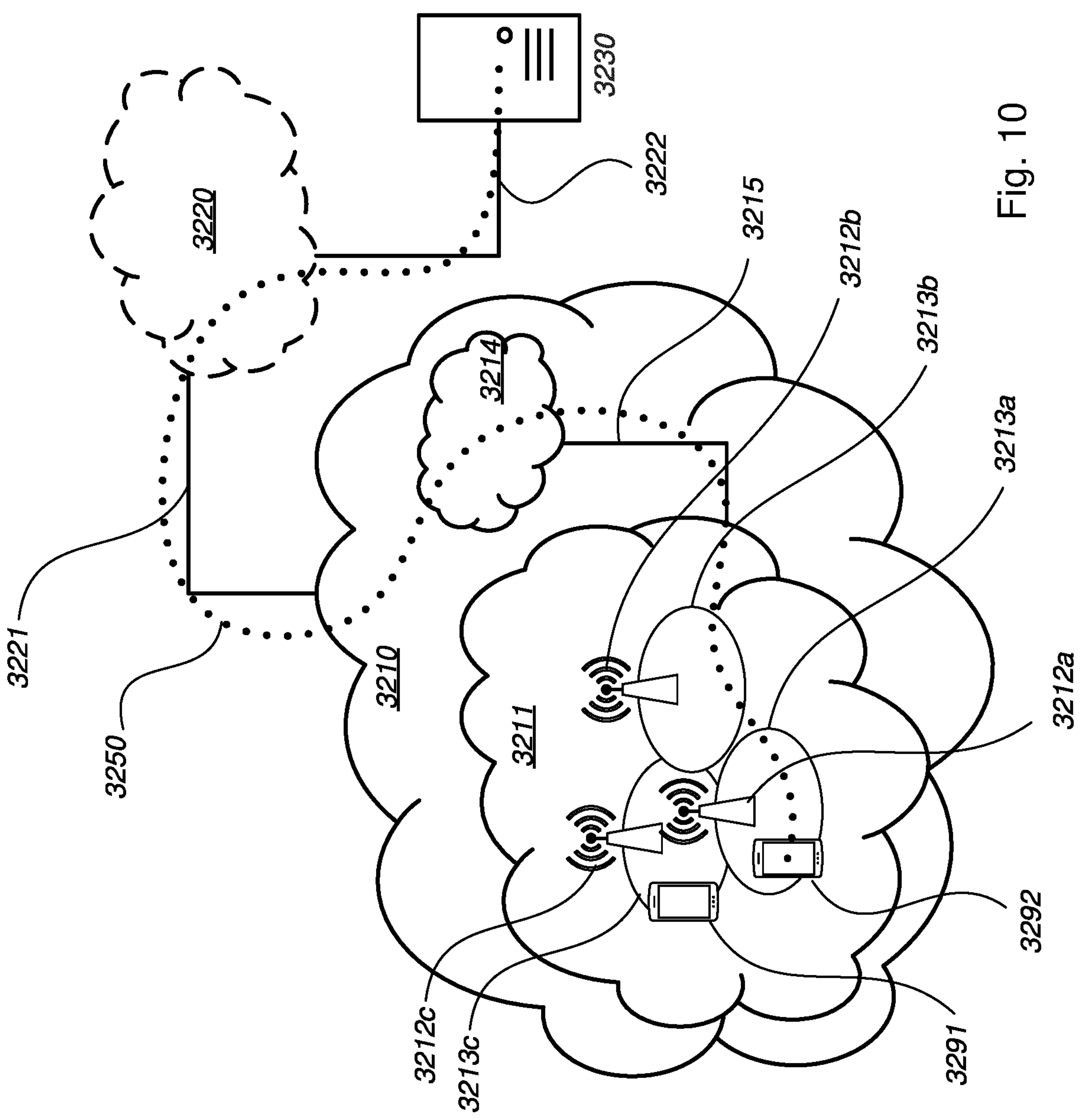
FIG. 10 schematically illustrates a telecommunication network connected via an intermediate network to a host computer.

With reference to FIG. 10, in accordance with an embodiment, a communication system includes a telecommunication network 3210, such as a 3GPP-type cellular network, which comprises an access network 3211, such as a radio access network, and a core network 3214. The access network 3211 comprises a plurality of base stations 3212*a*, 3212*b*, 3212*c*, such as NBs, eNBs, gNBs or other types of wireless access points being examples of the radio network node 12 herein, each defining a corresponding coverage area 3213*a*, 3213*b*, 3213*c*. Each base station 3212*a*, 3212*b*, 3212*c* is connectable to the core network 3214 over a wired or wireless connection 3215. A first user equipment (UE) 3291, being an example of the UE 10, located in coverage area 3213*c* is configured to wirelessly connect to, or be paged by, the corresponding base station 3212*c*. A second UE 3292 in coverage area 3213*a* is wirelessly connectable to the corresponding base station 3212*a*. While a plurality of UEs 3291, 3292 are illustrated in this example, the disclosed embodiments are equally applicable to a situation where a sole UE is in the coverage area or where a sole UE is connecting to the corresponding base station 3212.

The telecommunication network 3210 is itself connected to a host computer 3230, which may be embodied in the hardware and/or software of a standalone server, a cloud-implemented server, a distributed server or as processing resources in a server farm. The host computer 3230 may be under the ownership or control of a service provider, or may be operated by the service provider or on behalf of the service provider. The connections 3221, 3222 between the telecommunication network 3210 and the host computer 3230 may extend directly from the core network 3214 to the host computer 3230 or may go via an optional intermediate network 3220. The intermediate network 3220 may be one of, or a combination of more than one of, a public, private or hosted network; the intermediate network 3220, if any, may be a backbone network or the Internet; in particular, the intermediate network 3220 may comprise two or more sub-networks (not shown).

The communication system of FIG. 10 as a whole enables connectivity between one of the connected UEs 3291, 3292 and the host computer 3230. The connectivity may be described as an over-the-top (OTT) connection 3250. The host computer 3230 and the connected UEs 3291, 3292 are configured to communicate data and/or signalling via the OTT connection 3250, using the access network 3211, the core network 3214, any intermediate network 3220 and possible further infrastructure (not shown) as intermediaries. The OTT connection 3250 may be transparent in the sense that the participating communication devices through which the OTT connection 3250 passes are unaware of routing of uplink and downlink communications. For example, a base station 3212 may not or need not be informed about the past routing of an incoming downlink communication with data originating from a host computer 3230 to be forwarded (e.g., handed over) to a connected UE 3291. Similarly, the base station 3212 need not be aware of the future routing of an outgoing uplink communication originating from the UE 3291 towards the host computer 3230.

Example implementations, in accordance with an embodiment, of the UE, base station and host computer discussed in the preceding paragraphs will now be described with reference to FIG. 11. In a communication system 3300, a host computer 3310 comprises hardware 3315 including a communication interface 3316 configured to set up and maintain a wired or wireless connection with an interface of a different communication device of the communication system 3300. The host computer 3310 further comprises processing circuitry 3318, which may have storage and/or processing capabilities. In particular, the processing circuitry 3318 may comprise one or more programmable processors, application-specific integrated circuits, field programmable gate arrays or combinations of these (not shown) adapted to execute instructions. The host computer 3310 further comprises software 3311, which is stored in or accessible by the host computer 3310 and executable by the processing circuitry 3318. The software 3311 includes a host application 3312. The host application 3312 may be operable to provide a service to a remote user, such as a UE 3330 connecting via an OTT connection 3350 terminating at the UE 3330 and the host computer 3310. In providing the service to the remote user, the host application 3312 may provide user data which is transmitted using the OTT connection 3350.

The communication system 3300 further includes a base station 3320 provided in a telecommunication system and comprising hardware 3325 enabling it to communicate with the host computer 3310 and with the UE 3330. The hardware 3325 may include a communication interface 3326 for setting up and maintaining a wired or wireless connection with an interface of a different communication device of the communication system 3300, as well as a radio interface 3327 for setting up and maintaining at least a wireless connection 3370 with a UE 3330 located in a coverage area (not shown in FIG. 11) served by the base station 3320. The communication interface 3326 may be configured to facilitate a connection 3360 to the host computer 3310. The connection 3360 may be direct or it may pass through a core network (not shown in FIG. 11) of the telecommunication system and/or through one or more intermediate networks outside the telecommunication system. In the embodiment shown, the hardware 3325 of the base station 3320 further includes processing circuitry 3328, which may comprise one or more programmable processors, application-specific integrated circuits, field programmable gate arrays or combinations of these (not shown) adapted to execute instructions. The base station 3320 further has software 3321 stored internally or accessible via an external connection.

The communication system 3300 further includes the UE 3330 already referred to. Its hardware 3335 may include a radio interface 3337 configured to set up and maintain a wireless connection 3370 with a base station serving a coverage area in which the UE 3330 is currently located. The hardware 3335 of the UE 3330 further includes processing circuitry 3338, which may comprise one or more programmable processors, application-specific integrated circuits, field programmable gate arrays or combinations of these (not shown) adapted to execute instructions. The UE 3330 further comprises software 3331, which is stored in or accessible by the UE 3330 and executable by the processing circuitry 3338. The software 3331 includes a client application 3332. The client application 3332 may be operable to provide a service to a human or non-human user via the UE 3330, with the support of the host computer 3310. In the host computer 3310, an executing host application 3312 may communicate with the executing client application 3332 via the OTT connection 3350 terminating at the UE 3330 and the host computer 3310. In providing the service to the user, the client application 3332 may receive request data from the host application 3312 and provide user data in response to the request data. The OTT connection 3350 may transfer both the request data and the user data. The client application 3332 may interact with the user to generate the user data that it provides.

Figure 11:
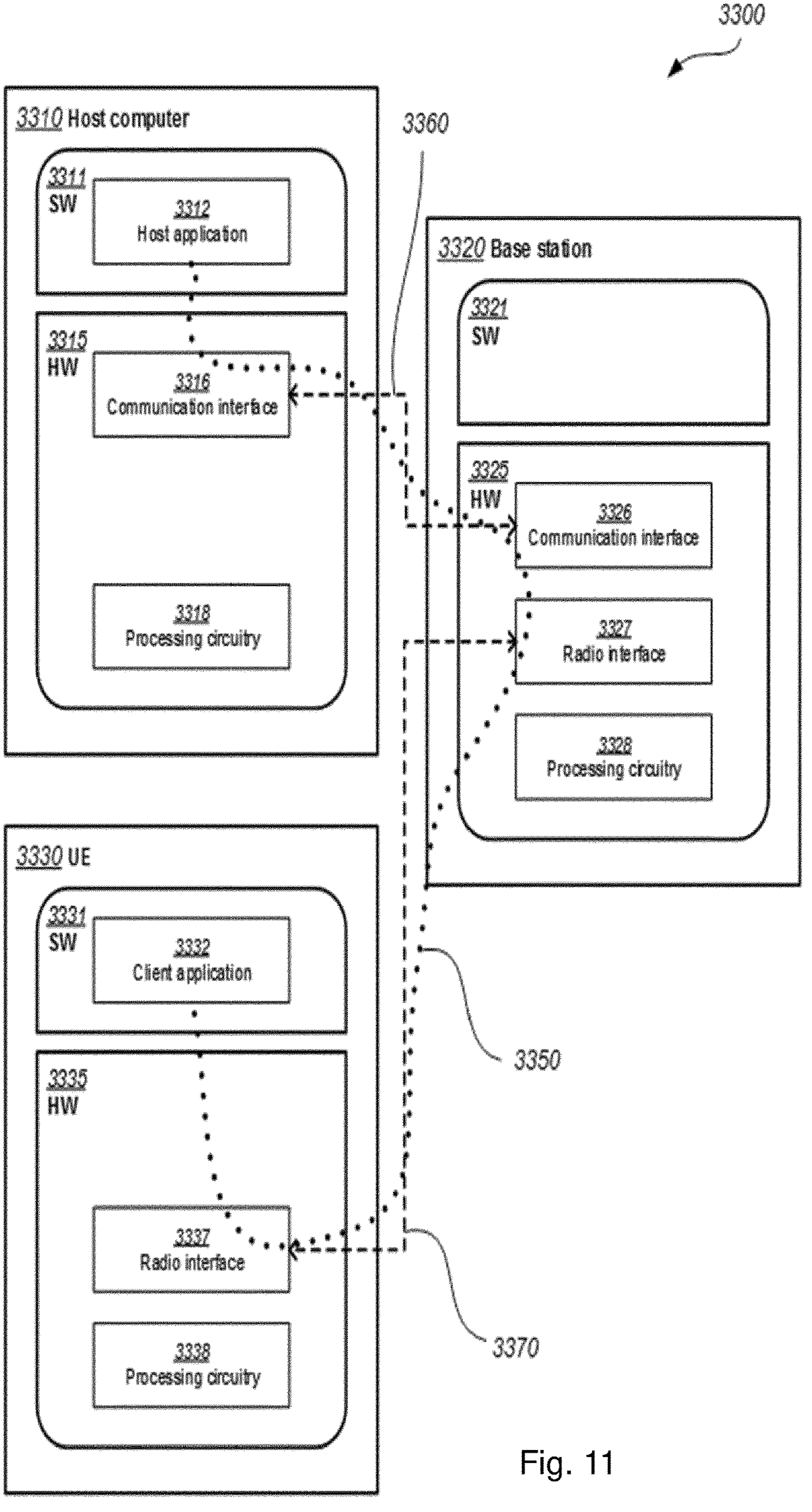
FIG. 11 is a generalized block diagram of a host computer communicating via a base station with a user equipment over a partially wireless connection.

It is noted that the host computer 3310, base station 3320 and UE 3330 illustrated in FIG. 11 may be identical to the host computer 3230, one of the base stations 3212*a*, 3212*b*, 3212*c* and one of the UEs 3291, 3292 of FIG. 10, respectively. This is to say, the inner workings of these entities may be as shown in FIG. 11 and independently, the surrounding network topology may be that of FIG. 10.

In FIG. 11, the OTT connection 3350 has been drawn abstractly to illustrate the communication between the host computer 3310 and the user equipment 3330 via the base station 3320, without explicit reference to any intermediary devices and the precise routing of messages via these devices. Network infrastructure may determine the routing, which it may be configured to hide from the UE 3330 or from the service provider operating the host computer 3310, or both. While the OTT connection 3350 is active, the network infrastructure may further take decisions by which it dynamically changes the routing (e.g., on the basis of load balancing consideration or reconfiguration of the network).

The wireless connection 3370 between the UE 3330 and the base station 3320 is in accordance with the teachings of the embodiments described throughout this disclosure. One or more of the various embodiments improve the performance of OTT services provided to the UE 3330 using the OTT connection 3350, in which the wireless connection 3370 forms the last segment. More precisely, the teachings of these embodiments may improve the performance since beam management of the UE may be handled more efficiently and thereby provide benefits such as reduced user waiting time, and better responsiveness.

A measurement procedure may be provided for the purpose of monitoring data rate, latency and other factors on which the one or more embodiments improve. There may further be an optional network functionality for reconfiguring the OTT connection 3350 between the host computer 3310 and UE 3330, in response to variations in the measurement results. The measurement procedure and/or the network functionality for reconfiguring the OTT connection 3350 may be implemented in the software 3311 of the host computer 3310 or in the software 3331 of the UE 3330, or both. In embodiments, sensors (not shown) may be deployed in or in association with communication devices through which the OTT connection 3350 passes; the sensors may participate in the measurement procedure by supplying values of the monitored quantities exemplified above, or supplying values of other physical quantities from which software 3311, 3331 may compute or estimate the monitored quantities. The reconfiguring of the OTT connection 3350 may include message format, retransmission settings, preferred routing etc.; the reconfiguring need not affect the base station 3320, and it may be unknown or imperceptible to the base station 3320. Such procedures and functionalities may be known and practiced in the art. In certain embodiments, measurements may involve proprietary UE signalling facilitating the host computer's 3310 measurements of throughput, propagation times, latency and the like. The measurements may be implemented in that the software 3311, 3331 causes messages to be transmitted, in particular empty or 'dummy' messages, using the OTT connection 3350 while it monitors propagation times, errors etc.

Figure 12:
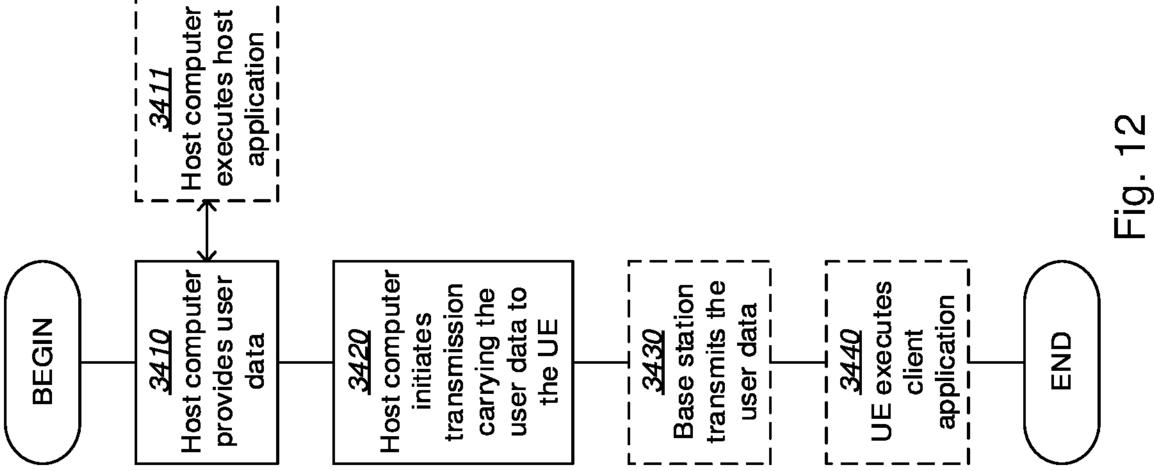

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In a first step 3410 of the method, the host computer provides user data. In an optional substep 3411 of the first step 3410, the host computer provides the user data by executing a host application. In a second step 3420, the host computer initiates a transmission carrying the user data to the UE. In an optional third step 3430, the base station transmits to the UE the user data which was carried in the transmission that the host computer initiated, in accordance with the teachings of the embodiments described throughout this disclosure. In an optional fourth step 3440, the UE executes a client application associated with the host application executed by the host computer.

Figure 13:
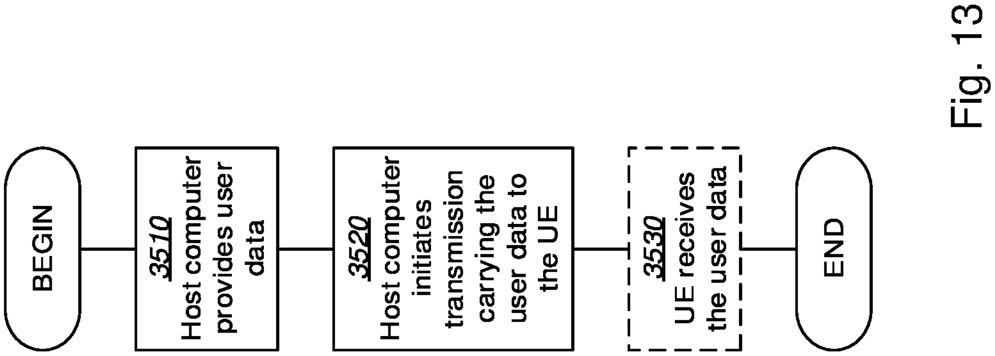
FIGS. 12, 13, 14, and 15 are flowcharts illustrating methods implemented in a communication system including a host computer, a base station and a user equipment.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In a first step 3510 of the method, the host computer provides user data. In an optional substep (not shown) the host computer provides the user data by executing a host application. In a second step 3520, the host computer initiates a transmission carrying the user data to the UE. The transmission may pass via the base station, in accordance with the teachings of the embodiments described throughout this disclosure. In an optional third step 3530, the UE receives the user data carried in the transmission.

Figure 14:
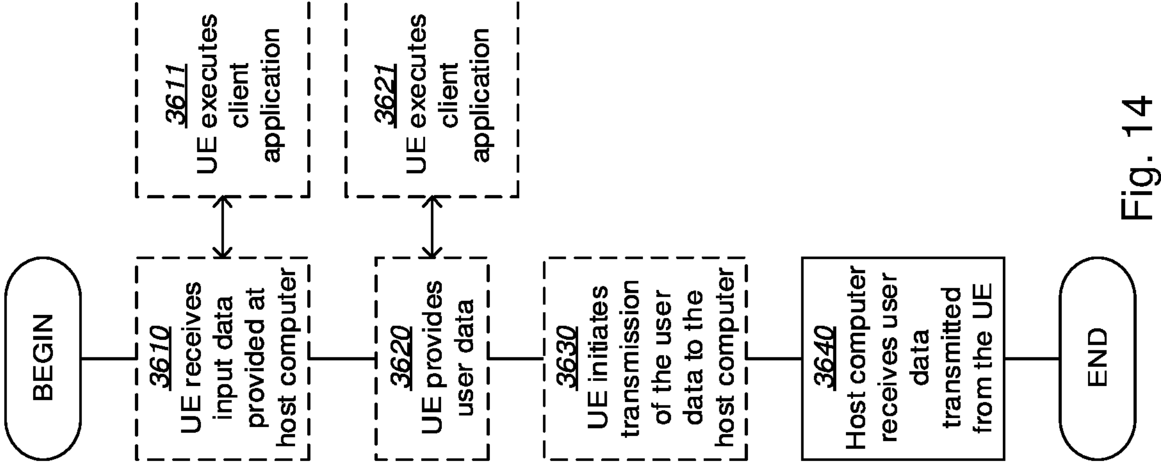

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In an optional first step 3610 of the method, the UE receives input data provided by the host computer. Additionally or alternatively, in an optional second step 3620, the UE provides user data. In an optional substep 3621 of the second step 3620, the UE provides the user data by executing a client application. In a further optional substep 3611 of the first step 3610, the UE executes a client application which provides the user data in reaction to the received input data provided by the host computer. In providing the user data, the executed client application may further consider user input received from the user. Regardless of the specific manner in which the user data was provided, the UE initiates, in an optional third substep 3630, transmission of the user data to the host computer. In a fourth step 3640 of the method, the host computer receives the user data transmitted from the UE, in accordance with the teachings of the embodiments described throughout this disclosure.

Figure 15:
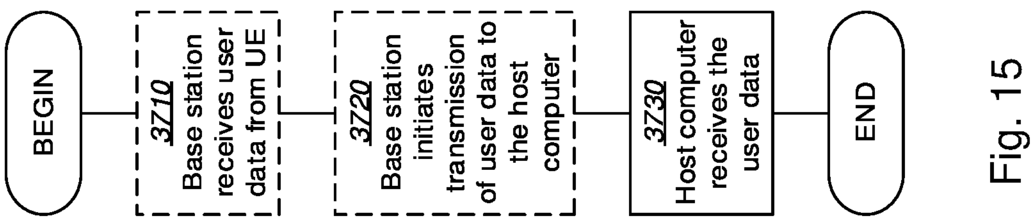

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In an optional first step 3710 of the method, in accordance with the teachings of the embodiments described throughout this disclosure, the base station receives user data from the UE. In an optional second step 3720, the base station initiates transmission of the received user data to the host computer. In a third step 3730, the host computer receives the user data carried in the transmission initiated by the base station.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a user equipment (UE) for handling communication in a wireless communication network, the method comprising:

obtaining an indication of a performance of one or more beams of an antenna panel of the UE; and adapting one or more beam parameters of at least one antenna panel of the UE based on the obtained indication, wherein the one or more beam parameters are for establishing one or more beams of the at least one antenna panel of the UE, and wherein the adapting the one or more beam parameters comprises removing a beam of a grid of beams for the at least one antenna panel of the UE and wherein the indication is indicating that the removed beam is overlapping a coverage of another beam, that the removed beam has a similar incidence or departure angle as another beam, and/or that the removed beam is not used over a time period.

2. The method according to claim 1, wherein adapting the one or more beam parameters comprises adding a beam of a grid of beams for the at least one antenna panel of the UE, and/or widening a coverage of a beam of the grid of beams for the at least one antenna panel of the UE.

3. The method according to claim 2, wherein the indication of the performance comprises a measurement of a strength or quality of a signal, and wherein adding the beam or widening the coverage of a beam is based on the measurement.

4. The method according to claim 1, wherein adapting the one or more beam parameters comprises adding a priority for monitoring of one or more beams of a grid of beams for the at least one antenna panel of the UE.

5. The method according to claim 1, further comprising using the adapted one or more beam parameters to monitor beams of a grid of beams for the at least one antenna panel of the UE.

6. The method according to claim 1, wherein the indication is related to a present location and/or position of the UE and adapting the one or more beam parameters is based on the present location and/or position of the UE.

7. The method according to claim 1, wherein the indication is related to an application presently used at the UE and adapting the one or more beam parameters is based on the application used.

8. The method according to claim 1, wherein the indication is of a present performance, and adapting the one or more beam parameters comprises dynamically changing the one or more beam parameters of the at least one antenna panel of the UE based on the present performance.

9. The method according to claim 1, wherein the one or more beams are one or more reception beams and/or transmission beams.

10. A non-transitory computer-readable storage medium, having stored thereon instructions which, when executed on at least one processor, cause the at least one processor to carry out the method according to claim 1, as performed by the UE.

11. A user equipment (UE) for handling communication in a wireless communication network, wherein the UE is configured to:

obtain an indication of a performance of one or more beams of an antenna panel of the UE; and adapt one or more beam parameters of at least one antenna panel of the UE based on the obtained indication, wherein the one or more beam parameters are for establishing one or more beams of the at least one antenna panel of the UE, and wherein adapting the one or more beam parameters comprises removing a beam of a grid of beams for the at least one antenna panel of the UE and wherein the indication is indicating that the removed beam is overlapping a coverage of another beam, that the removed beam has a similar incidence or departure angle as another beam, and/or that the removed beam is not used over a time period.

12. The UE according to claim 11, wherein the UE is configured to adapt the one or more beam parameters by adding a beam of a grid of beams for the at least one antenna panel of the UE, and/or by widening a coverage of a beam of the grid of beams for the at least one antenna panel of the UE.

13. The UE according to claim 12, wherein the indication of the performance comprises a measurement of a strength or quality of a signal, and wherein the UE is configured to add the beam or widen the coverage of a beam based on the measurement.

14. The UE according to claim 11, wherein the UE is configured to adapt the one or more beam parameters by adding a priority for monitoring of one or more beams of a grid of beams for the at least one antenna panel of the UE.

15. The UE according to claim 11, wherein the UE is configured to use the adapted one or more beam parameters to monitor beams of a grid of beams for the at least one antenna panel of the UE.

* * * * *